United States Patent Office 3,364,100
Patented Jan. 16, 1968

3,364,100
ADHERING TEXTILE MATERIALS TO RUBBER
Arthur C. Danielson, Royal Oak, Mich., assignor to Uniroyal, Inc., a corporation of New Jersey
No Drawing. Filed Apr. 8, 1964, Ser. No. 358,412
20 Claims. (Cl. 161—241)

ABSTRACT OF THE DISCLOSURE

The invention relates to improving the adhesion of rubber to textile materials by incorporating two components into the rubber prior to vulcanization. The first component is trimethylolnitromethane, 1,1-dimethylol-1-nitroethane, 1,1-dimethylol-1-nitropropane, tris(acetoxymethyl)nitromethane, 1,1 - bis(acetoxymethyl) - 1-nitroethane or 1,1-bis(acetoxymethyl)-1-nitropropane. The second component is resorcinol or other meta disubstituted benzene.

---

This invention relates to improvements in the methods of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure. In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g. a fusible partially reacted resorcinol-formaldehyde resin, such as a condensate of resorcinol and formaldehyde in the ratio of 1 mole of resorcinol to about 0.5 to 0.8 of formaldehyde, and formaldehyde or a formaldehyde-yielding agent which on subsequent heating as during vulcanization of the rubber intermediate the textile plies cures the fusible resin to an infusible state.

According to one aspect of the present invention, there is obtained a further improvement in adhesion of the textile material to the rubber intermediate the textile plies in addition to that obtained by the latex "solutioning" treatment of the textile material. Also, improved adhesion can be obtained between rubber and untreated textile material.

In carrying out the present invention, adhesion of the textile material, which may be bare (so-called grey) or which may be latex "solutioned," to the rubber layers intermediate the textile plies is greatly improved by incorporating in the solid rubber intermediate the textile plies an "Ingredient A," viz: trimethylolnitromethane, 1,1-dimethylol-1-nitroethane, 1,1 - dimethylol-1-nitropropane, tris(acetoxymethyl) nitromethane, 1,1-bis(acetoxymethyl-1-nitroethane or 1,1-bis(acetoxymethyl)-1-nitropropane (hereinafter generally called "Ingredient A") and an "Ingredient B," viz: resorcinol or other meta disubstituted benzene in which each of the substituents is an OH, $NH_2$ or $OCOCH_3$ radical (e.g. m-aminophenol, m-phenylenediamine, resorcinol monoacetate, resorcinol diacetate), or 1,5-naphthalenediol, or a fusible partially reacted resorcinol-formaldehyde resin (condensate of resorcinol and formaldehyde in the ratio of one mole of resorcinol to about 0.5 to 0.8 mole of formaldehyde), or a condensation product of resorcinol and acetone (condensate or resorcinol and acetone in the ratio of one mole of resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde). Such fusible partially reacted resorcinol-formaldehyde resins and those used in the above mentioned latex "solutioning" compositions may be prepared in known manner by heating a concentrated aqueous solution of the resorcinol and formaldehyde, with or without a catalyst such as oxalic acid. The ball and ring softening point (ASTM designation E28–58T) of such fusible partially reacted resins will generally be from about 60° C. to 120° C. Such resorcinol-acetone condensates, which are white powders, may be prepared in known manner by reacting the acetone and resorcinol in dilute hydrochloric acid solution at temperatures from 35° C. to 50° C. for several hours. Such resorcinol-acetaldehyde condensates, which are tacky reddish oils, may be prepared in known manner by reacting the acetaldehyde and resorcinol in dilute oxalic acid solution at 100° C., for several hours. The trimethylolnitromethane and the other "Ingredients A" are known compounds; see "Aldehyde-Nitroparaffin Condensaton" by Vanderbilt et al., Ind. Eng. Chem. 32, 34–38 (1940). The Ingredient A and Ingredient B will react on heating, as in the vulcanization of the rubber to form an infusible resin.

The rubber intermediate the textile plies may be applied in the usual manner by calendering a coating of solid vulcanizable rubber composition containing the Ingredient A and Ingredient B on the textile material, generally on both sides, e.g. as in the conventional coating of tire cord fabric with tire carcass stock. Ingredient A and Ingredient B may be mixed with the conventional compounding ingredients in the solid rubber in a Banbury mixer and the rubber composition then calendered on the textile material. After building the rubber-coated textile material into the finished article, e.g. a tire, the assembly is heated to vulcanize the rubber components thereof. The ratio of Ingredient A to Ingredient B is not critical and generally will be from 0.4 to 4 parts of Ingredient A per part of Ingredient B. The amount of Ingredient A and Ingredient B mixed with the rubber is not critical. Generally 0.5 to 8 parts, and preferably 1 to 4 parts, of Ingredient A and Ingredient B (total) per 100 parts of the rubber will be mixed in the rubber compound to be calendered on the textile material. Where the textile material is passed through a rubber latex "solutioning" bath and dried, the deposit on the thus treated textile material will be the range of 1 to 15 percent, preferably 2 to 10 percent, of latex solids based on the weight of the textile material.

The solid rubber used in the present invention for making the rubber and fabric laminates for use in tire manufacture and for other purposes may be natural (Hevea) rubber or conjugated diolefine polymer synthetic rubber or mixtures of any of them including their reclaims. The aqueous dispersion of rubber, when used for "solutioning" the textile material before plying with the solid rubber composition, may be natural rubber latex, or a latex of conjugated diolefine polymer synthetic rubber, or mixtures thereof, or an aqueous dispersion of reclaim from such rubbers, or mixtures of any such latices and reclaim dispersions. Such conjugated diolefine polymer synthetic rubbers are polymers of butadienes-1,3, e.g. butadiene-1,3, isoprene, 2,3-dimethyl-butadiene-1,3, and copolymers of mixtures thereof, and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contain a CH$_2$=C< group where at least one of the disconnected valences is attached to an electro-negative group, that is, a group which substantially increases the electrical dissymmetry or polar character of the molecule. Examples of compounds which contain a CH$_2$=C< group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons) and synthetic linear polyamides (e.g. nylons), and may comprise cords or woven fabrics.

The following examples illustrate the invention. All parts and percentages referred to herein are by weight.

*Example 1*

A rubber compound A was prepared by mixing 100 parts of natural rubber, 33 parts of carbon black, 1.25 parts of resorcinol, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiazole-sulfenamide), 1.72 parts of trimethylol-nitromethane, and 3.5 parts of sulfur.

Rubber compound B was prepared similarly to compound A except 1.05 parts of trimethylolnitromethane were added instead of 1.7 parts of trimethylolnitromethane.

Rubber compound C was prepared similarly to compound A except 0.57 part of trimethylolnitromethane was added instead of 1.72 parts of trimethylolnitromethane.

Rubber compounds D, E and F were prepared similarly to compounds A, B and C respectively, except 1.25 parts of m-aminophenol were added instead of the 1.25 parts of resorcinol.

Rubber compounds G, H and I were prepared similarly to compounds A, B and C, respectively, except 1.25 parts of m-phenylenediamine were added instead of the 1.25 parts of resorcinol.

Rubber compound J was prepared similarly to compound A except 1.72 parts of resorcinol monoacetate was added instead of the 1.25 parts of resorcinol and 2 parts of trimethylolnitromethane were added instead of 1.72 parts of trimethylolnitromethane.

Rubber compound K was prepared similarly to compound A except 2.20 parts of resorcinol diacetate were added instead of the 1.25 parts of resorcinol and 2 parts of trimethylolnitromethane were added instead of 1.72 parts of trimethylolnitromethane.

Rubber compounds L and M were prepared similarly to compound A except 1.75 parts and 2 parts, respectively, of 1,1-dimethylol-1-nitroethane were added instead of the 1.72 parts of trimethylolnitromethane.

Rubber compounds N and O were prepared similarly to compound A except 1.75 parts and 2 parts, respectively, of 1,1-dimethylol-1-nitropropane were added instead of the 1.72 parts of trimethylolnitromethane.

Rubber compound P was prepared similarly to compound A except 1.25 parts of m-aminophenol were added instead of the 1.25 parts of resorcinol and 2 parts of 1,1-dimethylol-1-nitroethane were added instead of the 1.72 parts of trimethylolnitromethane.

Rubber compound Q was prepared similarly to compound A except 1.82 parts of 1,5-naphthalenediol were added instead of the 1.25 parts of resorcinol and 2 parts of 1,1-dimethylol-1-nitroethane were added instead of the 1.72 parts of trimethylolnitromethane.

Rubber compound R was prepared similarly to compound A except 1.25 parts of m-aminophenol were added instead of the 1.25 parts of resorcinol and 2 parts of 1,1-dimethylol-1-nitropropane were added instead of the 1.72 parts of trimethylolnitromethane.

Rubber compound S was prepared similarly to compound A except 1.82 parts of 1,5-naphthalenediol were added instead of the 1.25 parts of resorcinol and 2 parts of 1,1-dimethylol-1-nitropropane were added instead of the 1.72 parts of trimethylolnitromethane.

Rubber compound T was prepared similarly to compound A except 3.65 parts of tris(acetoxymethyl)nitromethane were added instead of the 1.72 parts of trimethylolnitromethane.

Rubber compound U was prepared similarly to compound A except 3.24 parts of 1,1-bis(acetoxymethyl)-1-nitroethane were added instead of the 1.72 parts of trimethylolnitromethane.

Rubber compound V was prepared similarly to compound A except 3.13 parts of 1,1-bis(acetoxymethyl)-1-nitropropane were added instead of the 1.72 parts of trimethylolnitromethane.

Control rubber compounds were prepared similarly to compound A except the resorcinol and trimethylolnitromethane were omitted.

The adhesion of rubber compounds A to V and the controls to bare (grey) tire cords made of rayon and nylon fibers was measured at 250° F. by the "H" adhesion test described in Ind. Rub. World, vol. 114, page 213 (1946), "Study of the 'H' Test for Evaluating the Adhesive Properties of Tire Cord in Natural and GR-S Rubbers," and in ASTM designation D2138–62T. In this test, the cord under test coated with the rubber compound under test is embedded in two separate standard rubber blocks and the assembly vulcanized. The pounds necessary to pull the adhered cord free of one of the rubber blocks is the "H" adhesion value. The higher the figure, the better the adhesion of the rubber coating to the cord. Test pieces for the rubber compounds A to V and the controls were vulcanized 30 minutes at 307° F. The results are shown in the following table:

[250° F. "H" adhesion (lbs.)]

| Compound | Grey Rayon | Grey Nylon |
|---|---|---|
| A | 8.7 | 10.8 |
| B | 7.4 | 5.9 |
| C | 3.3 | 4.9 |
| D | 5.7 | 4.8 |
| E | 9.9 | 8.2 |
| F | 9.8 | 7.6 |
| G | 14.1 | 10.6 |
| H | 15.4 | 10.7 |
| I | 9.4 | 6.7 |
| J | 10.1 | 9.8 |
| K | 9.7 | 9.3 |
| L | 8.7 | 10.7 |
| M | 7.9 | 10.0 |
| N | 9.6 | 14.7 |
| O | 9.1 | 16.4 |
| P | 8.7 | 14.7 |
| Q | 8.9 | 14.0 |
| R | 9.1 | 15.1 |
| S | 8.3 | 17.7 |
| T | 8.2 | 18.4 |
| U | 4.8 | 17.8 |
| V | 6.7 | 21.0 |
| Control (Average) | 2.2 | 3.6 |

Example 2

A rubber compound was prepared by mixing 68 parts of oil extended SBR (containing 18 parts of oil and 50 parts of a copylymer of about 77 parts of butadiene and 23 parts of styrene), 50 parts of natural rubber, 25 parts of whole tire reclaimed rubber of about 50% rubber content, 50 parts of carbon black, 1.25 parts of resorcinol, 1.5 parts of stearic acid, 1 part of non-staining antioxidant Naugawhite (alkylated bisphenol), 3 parts of No. 8 oil (processing oil), 10 parts of zinc oxide, 4.0 parts of pine tar oil, 0.85 part of accelerator CBS (N-cyclohexyl-2-benzothiazole sulfenamide), 1.5 parts of diphenylguanidine, 2 parts of trimethylolnitromethane, and 3.5 parts of sulfur.

Rubber compound B was prepared similarly to compound A except 1.25 parts of m-phenylenediamine were added instead of the 1.25 parts of resorcinol.

Rubber compound C was prepared similarly to compound A except 1.25 parts of m-aminophenol were added instead of the 1.25 parts of resorcinol.

Rubber compound D was prepared similarly to compound A except 2.0 parts of a condensation product of equimolar proportions of resorcinol and acetone were added instead of the 1.25 parts of resorcinol.

Rubber compound E was prepared similarly to compound A except 2.1 parts of a commercial fusible partially reacted resorcinol-formaldehyde resin (ratio of 1 mole of resorcinol to about 0.6 to 0.8 mole of formaldehyde) were added instead of the 1.25 parts of resorcinol.

Rubber compound F was prepared similarly to compound A except 2 parts of 1,1-dimethylol-1-nitroethane were added instead of the 2 parts trimethylolnitromethane, and 2 parts of a condensation product of equimolar proportions of resorcinol and acetone were added instead of the 1.25 parts of resorcinol.

Rubber compound G was prepared similarly to compound A except 2 parts of 1,1-dimethylol-1-nitroethane were added instead of the 2 parts of trimethylolnitromethane, and 2 parts of a condensation product of resorcinol and acetaldheyde in the ratio of 0.6 mole of acetaldehyde per mole of resorcinol were added instead of the 1.25 parts of resorcinol.

Rubber compound H was prepared similarly to compound A except 2 parts of 1,1-dimethylol-1-nitroethane were added instead of the 2 parts of trimethylolnitromethane, and 2 parts of a commercial fusible partially reacted resorcinol-formaldehyde resin (ratio of 1 mole of resorcinol to about 0.6 to 0.8 mole of formaldehyde) were added instead of the 1.25 parts of resorcinol.

Rubber compound I was prepared similarly to compound A except 2 parts of 1,1-dimethylol-1-nitropropane were added instead of the 2 parts of trimethylolnitromethane, and 2 parts of a condensation product of equimolar proportions of resorcinol and acetone were added instead of the 1.25 parts of resorcinol.

Rubber compound J was prepared similarly to compound A except 2 parts of 1,1-dimethylol-1-nitropropane were added instead of the 2 parts of trimethylolnitromethane, and 2 parts of a condensation product of resorcinol and acetaldehyde in the ratio of 0.6 mole of acetaldehyde per mole of resorcinol were added instead of the 1.25 parts of resorcinol.

Rubber compound K was prepared similarly to compound A except 2 parts of 1,1-dimethylol-1-nitropropane were added instead of the 2 parts of trimethylolnitromethane, and 2 parts of a commercial fusible partially reacted resorcinol-formaldehyde resin (ratio of 1 mole of resorcinol to about 0.6 to 0.8 mole of formaldehyde) were added instead of the 1.25 parts of resorcinol.

A control rubber compound was prepared similarly to compound A except the resorcinol and trimethylolnitromethane were omitted.

The adhesion of rubber compounds A to K and the control to bare (grey) tire cords made of rayon and nylon fibers and of rubber compounds A, D and E to solutioned tire cords made of rayon and nylon fibers was measured at 250° F. by the "H" adhesion test. The solutioned rayon and nylon cords were passed through conventional latex "solutioning" baths, and dried. The "solutioning" bath used on rayon cords in this and the following example consisted of 80 parts solids of a copolymer of 50 parts of butadiene and 50 parts of styrene, 20 parts solids of a latex of a terpolymer of 70 parts of butadiene and 15 parts of vinyl pyridine and 15 parts of styrene, 8 parts of a commercial partially reacted resorcinol-formaldehyde resin (ratio of 1 mole of resorcinol to about 0.6 to 0.8 mole of formaldehyde) having a ball and ring softening point of about 110° C., 0.5 part of ammonia and 2 parts of formaldehyde, the solutioning bath being at a 15–20% concentration. The "solutioning" bath used on nylon cords in this and the following example comprised 100 parts solids of a latex of a copolymer of 70 parts of butadiene and 15 parts of vinyl pyridine and 15 parts of styrene, 15 parts of a commercial partially reacted resorcinol-formaldehyde resin (ratio of 1 mole of resorcinol to about 0.6 to 0.8 mole of formaldehyde) having a ball and ring softening point of about 110° C., 0.9 part of ammonia and 4.25 parts of formaldehyde, the solutioning bath being at a 15–20% concentration. These are conventional so-called latex cord dipping compounds. Test pieces for the rubber compounds A to K and the control were vulcanized for 30 minutes at 307° F. The results are shown in the following table:

[250° F. "H" adhesion (lbs.)]

| Compound | Grey Rayon | Grey Nylon | Solutioned Rayon | Solutioned Nylon |
|---|---|---|---|---|
| A | 10.7 | 8.3 | 15.6 | 16.3 |
| B | 8.3 | 3.1 | | |
| C | 3.8 | 3.1 | | |
| D | 6.4 | 6.9 | 15.7 | 15.6 |
| E | 11.6 | 10.2 | 15.7 | 16.9 |
| F | 3.9 | 5.5 | | |
| G | 11.3 | 4.6 | | |
| H | 12.6 | 7.3 | | |
| I | 5.7 | 8.0 | | |
| J | 14.2 | 11.5 | | |
| K | 11.7 | 8.4 | | |
| Control | 1.1 | 1.7 | 11.3 | 10.8 |

Example 3

A rubber compound was prepared by mixing 72 parts of natural rubber, 28 parts of cis-1,4-polybutadiene, 25 parts of carbon black, 1.25 parts of resorcinol, 10 parts of zinc oxide, 2.5 parts of antioxidant BLE (condensation product of acetone and diphenylamine), 0.25 part of antioxidant JZF (N,N'-diphenyl-p-phenylenediamine), 5 parts of pine tar oil, 1.5 parts of stearic acid, 0.7 part of accelerator NOBS Special (N-oxydiethylene benzothiazole-2-sulfenamide), 2 parts of trimethylolnitromethane, and 3.5 parts of sulfur.

Rubber compound B was prepared similarly to compound A except 1.25 parts of m-aminophenol were added instead of the 1.25 parts of resorcinol.

Rubber compound C was prepared similarly to compound A except 1.80 parts of 1,5-naphthalenediol were added instead of the 1.25 parts of resorcinol.

Rubber compound D was prepared similarly to compound A except 2 parts of a condensation product of equimolar proportions of resorcinol and acetone were added instead of the 1.25 parts of resorcinol.

Rubber compound E was prepared similarly to compound A except 2 parts of a commercial fusible partially reacted resorcinol-formaldehyde resin (ratio of 1 mole of resorcinol to about 0.6 to 0.8 mole of formaldehyde) were added instead of the 1.25 parts of resorcinol.

A control rubber compound was prepared similarly to compound A except the resorcinol and trimethylolnitromethane were omitted.

The adhesion of rubber compounds A to E and the control to bare (grey) and solutioned tire cords made of rayon and nylon was measured at 250° F. by the "H" adhesion test. Test pieces for the rubber compounds A to E and the control were vulcanized for 30 minutes at 307° F. The results are shown in the following table:

[250° F. "H" adhesion (lbs.)]

| Compound | Grey Rayon | Grey Nylon | Solutioned Rayon | Solutioned Nylon |
|---|---|---|---|---|
| A | 8.4 | 8.5 | 13.8 | 20.3 |
| B | 7.5 | 6.9 | 13.6 | 15.5 |
| C | 7.4 | 6.9 | 13.9 | 18.3 |
| D | 6.3 | 6.1 | 11.3 | 17.5 |
| E | 7.8 | 5.8 | 13.1 | 18.9 |
| Control | 2.4 | 3.5 | 9.7 | 16.4 |

*Example 4*

A rubber compound A was prepared by mixing 100 parts of Paracril BLT (a commercial synthetic rubber copolymer of a major proportion of butadiene and a minor proportion of acrylonitrile), 6 parts of zinc oxide, 55 parts of carbon black, 1.25 parts of resorcinol, 1 part of stearic acid, 15 parts of plasticizer (liquid copolymer of major proportion of butadiene and minor proportion of acrylonitrile, see U.S. Pat. Frolich No. 2,500,983), 0.6 part of accelerator (tetramethylthiuram monosulfide), 2 parts of trimethylolnitromethane, and 1.5 parts of sulfur.

Rubber compounds B, C and D were prepared similarly to compound A except that instead of the 1.25 parts of resorcinol in compound A, there was added in compound B two parts of a commercial fusible partially reacted resorcinol-formaldehyde resin (ratio of 1 mole of resorcinol to about 0.6 to 0.8 mole of formaldehyde), there was added in compound C two parts of a condensation product of equimolar proportions of resorcinol and acetone, and there were added in compound D two parts of a condensation product of resorcinol and acetaldehyde in the ratio of 0.6 mole of acetaldehyde per mole of resorcinol.

A control rubber compound was prepared similarly to compound A except the resorcinol and trimethylolnitromethane were omitted.

The adhesion of rubber compounds A to D and the control bare (grey) tire cords made of rayon and nylon fibers was measured at 250° F. by the "H" adhesion test. Test pieces for the rubber compounds A to D and the control were vulcanized for 30 minutes at 307° F. The results are shown in the following table:

[250° F. "H" adhesion (lbs.)]

| Compound | Grey Rayon | Grey Nylon |
|---|---|---|
| A | 5.0 | 4.5 |
| B | 10.7 | 13.8 |
| C | 3.9 | 3.9 |
| D | 7.0 | 10.5 |
| Control | 1.6 | 2.1 |

Comparing the "H" adhesion values of rubber compounds prepared according to the present invention in the above examples with the controls clearly shows the great improvement in adhesion of fibrous material to rubber by the present invention.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of laminating textile material and rubber, said rubber being natural rubber, a conjugated diolefin polymer synthetic rubber, their mixtures or their reclaims, by applying a solid vulcanizable rubber composition to a textile material and heating the assembly to vulcanize the rubber, the step which comprises incorporating in the rubber before vulcanization a compound selected from the group consisting of trimethylolnitromethane, 1,1-dimethylol-1-nitroethane, 1,1 - dimethylol - 1 - nitropropane, tris(acetoxymethyl)nitromethane, 1,1-bis(acetoxymethyl) - 1 - nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde.

2. In the method of laminating textile material and rubber, said rubber being natural rubber, a conjugated diolefin polymer synthetic rubber, their mixtures or their reclaims, by applying a solid vulcanizable rubber composition to a textile material containing the dried deposit of a rubber latex treating bath and heating the assembly to vulcanize the rubber, the step which comprises incorporating in the rubber before vulcanization a compound selected from the group consisting of trimethylolnitromethane, 1,1-dimethylol-1-nitroethane, 1,1-dimethylol-1-nitropropane, tris(acetoxymethyl)nitromethane, 1,1-bis(acetoxymethyl)-1-nitroethane and 1,1-bis(acetoxymethyl)-1-nitropropane, and resorcinol, m-aminophenol, m-phenylenediamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde.

3. In the method of laminating textile material and rubber, said rubber being natural rubber, a conjugated diolefin polymer synthetic rubber, their mixtures or their reclaims, by applying a solid vulcanizable rubber composition to a textile material and heating the assembly to vulcanize the rubber, the step which comprises incorporating in the rubber before vulcanization trimethylolnitromethane and a partially reacted resorcinol-formaldehyde resin.

4. In the method of laminating textile material and rubber, said rubber being natural rubber, a conjugated diolefin polymer synthetic rubber, their mixtures or their reclaims, by applying a solid vulcanizable rubber composition to a textile material and heating the assembly to vulcanize the rubber, the step which comprises incorporating in the rubber before vulcanization trimethylolnitromethane and a condensation product of resorcinol and acetone.

5. In the method of laminating textile material and rubber, said rubber being natural rubber, a conjugated diolefin polymer synthetic rubber, their mixtures or their reclaims, by applying a solid vulcanizable rubber composition to a textile material and heating the assembly to vulcanize the rubber, the step which comprises incorporating in the rubber before vulcanization trimethylolnitromethane and a condensation product of resorcinol and acetaldehyde.

6. A method of adhering textile material to rubber which comprises applying a solid vulcanizable rubber composition comprising rubber selected from the group consisting of natural Hevea rubber and conjugated diolefine polymer synthetic rubbers which are polymers of material selected from the group consisting of butadiene-1,3-isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing a compound selected from the group consisting of trimethylol-nitromethane, 1,1-dimethylol-1-nitroethane, 1,1-dimethylol-1-nitropropane, tris(acetoxymethyl)nitromethane, 1,1-bis(acetoxymethyl) - 1 - nitroethane and 1,1-bis(acetoxymethyl)-1-nitropropane, and a material selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde, to a textile material selected from the group consisting of cotton, rayon and nylon to coat the same, and heating the assembly to vulcanize the rubber and to firmly adhere the textile material to the vulcanized rubber composition.

7. A method of adhering textile material to rubber which comprises passing the textile material through a bath of an aqueous dispersion of rubber and drying, applying a solid vulcanizable rubber composition to the thus treated textile material, the rubber in said aqueous dispersion and in said solid rubber composition being selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing a compound selected from the group consisting of trimethylolnitromethane, 1,1-dimethylol-1-nitroethane, 1,1-dimethylol-1-nitropropane, tris(acetoxymethyl)nitromethane, 1,1 - bis(acetoxymethyl) - 1 - nitroethane and 1,1-bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde, to a textile material selected from the group consisting of cotton, rayon and nylon to coat the same, and heating the assembly to vulcanize the rubber and to firmly adhere the textile material to the vulcanized rubber composition.

8. A method of adhering tire cord fabric to a tire carcass stock, said stock being natural rubber, a conjugated diolefin polymer synthetic rubber, their mixtures or their reclaims, which comprises calendering on tire cord containing the dried deposit of a rubber latex treating bath a vulcanizable rubber tire carcass stock containing a compound selected from the group consisting of trimethylolnitromethane, 1,1 - dimethylol - 1 - nitroethane, 1,1 - dimethylol - 1 - nitropropane, tris(acetoxymethyl) nitromethane, 1,1 - bis(acetoxymethyl)-1-nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde, and subsequently heating to vulcanize the rubber and to firmly adhere the tire cord fabric to the vulcanized tire carcass stock.

9. A method of adhering tire cord fabric to a tire carcass stock, said stock being natural rubber, a conjugated diolefin polymer synthetic rubber, their mixtures or their reclaims, which comprises calendering on tire cord fabric containing the dried deposit of a rubber latex treating bath a vulcanizable tire carcass stock containing trimethylolnitromethane and a partially reacted resorcinol-formaldehyde resin, and subsequently heating to vulcanize the rubber and to firmly adhere the tire cord fabric to the vulcanized tire carcass stock.

10. A method of adhering tire cord fabric to a tire carcass stock, said stock being natural rubber, a conjugated diolefin polymer synthetic rubber, their mixtures or their reclaims, which comprises calendering on tire cord fabric containing the dried deposit of a rubber latex treating bath a vulcanizable tire carcass stock containing trimethylolnitromethane and a condensation product of resorcinol and acetone, and subsequently heating to vulcanize the rubber and to firmly adhere the tire cord fabric to the vulcanized tire carcass stock.

11. A method of adhering tire cord fabric to a tire carcass stock, said stock being natural rubber, a conjugated diolefin polymer synthetic rubber, their mixtures or their reclaims, which comprises calendering on tire cord fabric containing the dried deposit of a rubber latex treating bath a vulcanizable tire carcass stock containing trimethylolnitromethane and a condensation product of resorcinol and acetaldehyde, and subsequently heating to vulcanize the rubber and to firmly adhere the tire cord fabric to the vulcanized tire carcass stock.

12. A laminate of textile material and a calendered vulcanized rubber composition, said rubber being natural rubber, a conjugated diolefin polymer synthetic rubber, their mixtures or their reclaims, containing the reaction product of a compound selected from the group consisting of trimethylolnitromethane, 1,1 - dimethylol-1-nitroethane, 1,1 - dimethylol - 1 - nitropropane, tris(acetoxymethyl)nitromethane, 1,1 - bis(acetoxymethyl) - 1 - nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5 - naphthalenediol, partially reacted resorcinol-formaldehyde resins, condensation products of resorcinol and acetone, and condensation products of resorcinol and acetaldehyde.

13. A laminate of tire cord fabric and a vulcanized rubber tire carcass stock, said stock being natural rubber, a conjugated diolefin polymer synthetic rubber, their mixtures or their reclaims, containing the reaction product of a compound selected from the group consisting of trimethylolnitromethane, 1,1 - dimethylol - 1 - nitroethane, 1,1 - dimethylol - 1 - nitropropane, tris(acetoxymethyl) nitromethane, 1,1 - bis(acetoxymethyl) - 1 - nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol - formaldehyde resins, condensation products of resorcinol and acetone, and condensation products of resorcinol and acetaldehyde.

14. A laminate of tire cord fabric containing the dried deposit of a rubber latex treating bath, and a vulcanized rubber tire carcass stock, said stock being natural rubber, a conjugated diolefin polymer synthetic rubber, their mixtures or their reclaims, containing the reaction product of a compound selected from the group consisting of trimethylolnitromethane, 1,1 - dimethylol - 1 - nitroethane, 1,1 - dimethylol - 1 - nitropropane, tris(acetoxymethyl) nitromethane, 1,1 - bis(acetoxymethyl) - 1 - nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol - formaldehyde resins, condensation products of resorcinol and acetone, and condensation products of resorcinol and acetaldehyde.

15. A laminate of tire cord fabric containing the dried deposit of a rubber latex treating bath, and a vulcanized rubber tire carcass stock, said stock being natural rubber, a conjugated diolefin polymer synthetic rubber, their mixtures or their reclaims, containing the reaction product of trimethylolnitromethane and a partially reacted resorcinol-formaldehyde resin.

16. A laminate of tire cord fabric containing the dried deposit of a rubber latex treating bath, and a vulcanized rubber tire carcass stock, said stock being natural rubber, a conjugated diolefin polymer synthetic rubber, their mixtures or their reclaims, containing the reaction product of trimethylolnitromethane and a condensation product of resorcinol and acetone.

17. A solid vulcanizable rubber composition, said rubber being natural rubber, a conjugated diolefin polymer synthetic rubber, their mixtures or their reclaims, containing a compound selected from the group consisting of trimethylolnitromethane, 1,1 - dimethylol - 1 - nitroethane, 1,1 - dimethylol - 1 - nitropropane, tris(acetoxymethyl)nitromethane, 1,1 - bis(acetoxymethyl) - 1 - nitroethane and 1,1 - bis(acetoxymethyl) - 1 - nitropropane, and material selected from the group consisting of resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, and condensation products of resorcinol and acetaldehyde.

18. A solid vulcanizable rubber composition, said rubber being natural rubber, a conjugated diolefin polymer synthetic rubber, their mixtures or their reclaims, containing trimethylolnitromethane and a partially reacted resorcinol-formaldehyde resin.

19. A solid vulcanizable rubber composition, said rubber being natural rubber, a conjugated diolefin polymer synthetic rubber, their mixtures or their reclaims, containing trimethylolnitromethane and a condensation product of resorcinol and acetone.

20. A solid vulcanizable rubber composition, said rubber being natural rubber, a conjugated diolefin polymer synthetic rubber, their mixtures or their reclaims, containing trimethylolnitromethane and a condensation product of resorcinol and acetaldehyde.

References Cited

UNITED STATES PATENTS

| | | | |
|---|---|---|---|
| 2,211,945 | 8/1940 | Charch | 156—110 |
| 2,211,951 | 8/1940 | Hershberger | 156—110 |
| 3,018,207 | 1/1962 | Danielson | 156—110 |

OTHER REFERENCES

Wertheim: Textbook of Organic Chemistry, third edition, 1951, McGraw-Hill, New York, pp. 173, 310, 348.

EARL M. BERGERT, *Primary Examiner.*

C. B. COSBY, *Assistant Examiner.*